INVENTORS.
JAMES E. HIERS
EDWARD C. GROUT
BY
Hume, Groen, Clement & Hume
ATTORNEYS.

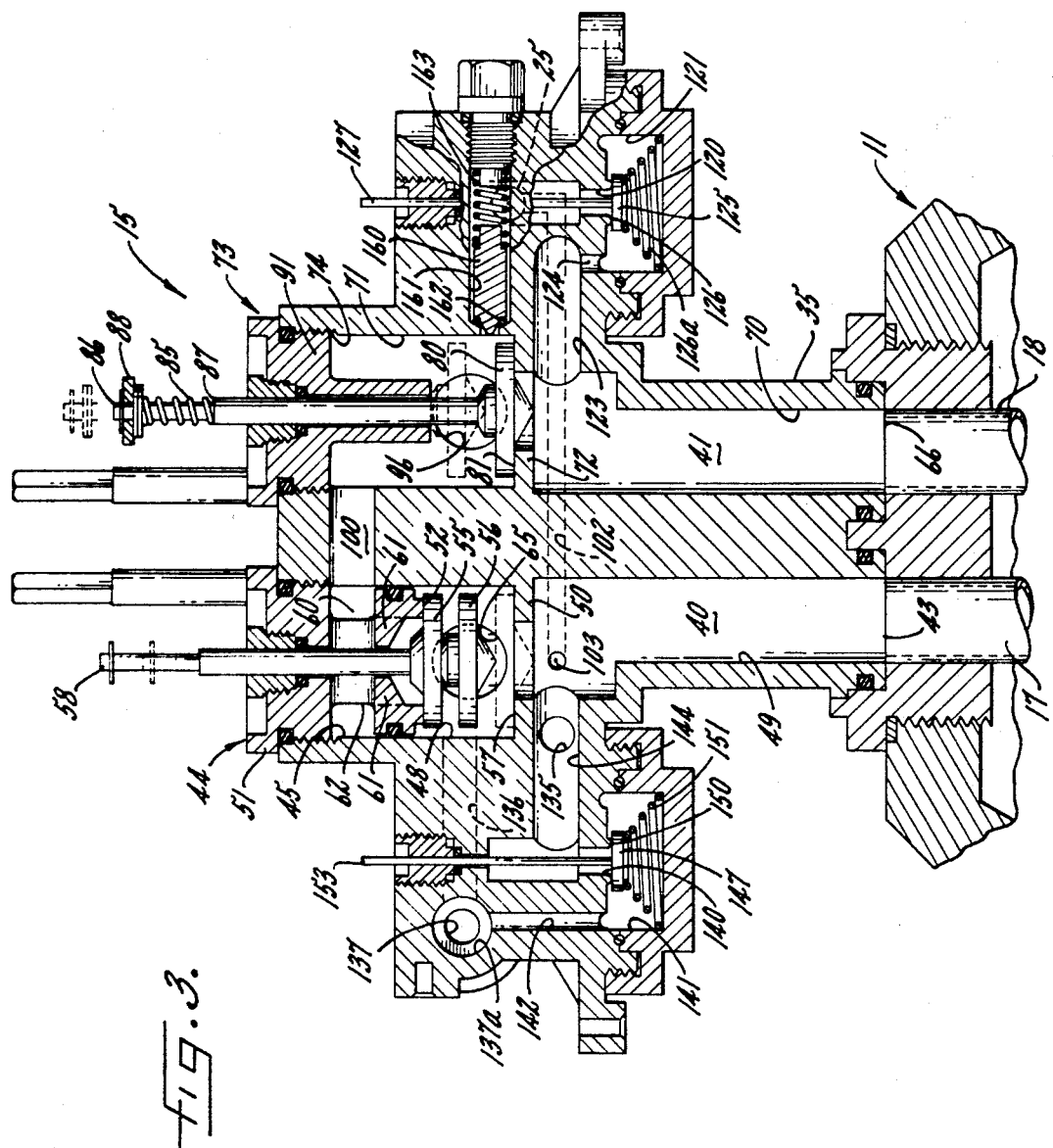

United States Patent Office 3,433,259
Patented Mar. 18, 1969

3,433,259
WATER SOFTENING VALVE
James E. Hiers, Mahtomedi, and Edward C. Grout, White Bear Lake, Minn., assignors to Union Tank Car Company, Chicago, Ill., a corporation of Delaware
Filed Jan. 3, 1966, Ser. No. 518,146
U.S. Cl. 137—599.1          8 Claims
Int. Cl. F16k *11/22;* G05b *19/00*

ABSTRACT OF THE DISCLOSURE

A water conditioning control valve assembly for a five cycle water conditioning system including service, backwash, brining, slow rinse and fast rinse. The assembly has first and second main passages, a transfer passage, a brining passage, a fast rinse passage, a first drain passage operable during backwash and a second drain passage operable during brining. A first valve controls flow through the first main passage, a second valve controls flow through the transfer passage, a third valve controls flow through the second main passage, a fast rinse valve controls flow through the fast rinse passage, and first and second drain valves control flow through the first and second drain passages, respectively.

During the service cycle, the first and third valves are open and the others are closed. During the backwash cycle, the second and third valves and first drain valve are open and the other valves are closed. During the brining cycle and the slow rinse cycle, the first and third valves, fast rinse valve and first drain valve are closed and the other valves are open. During the fast rinse cycle, the first and third valves and first drain valve are closed and the other valves are opened.

---

This invention relates in general to water conditioning. It deals more particularly with the control of water conditioning operations, including normal service and regeneration.

It is an object of the present invention to provide an improved control valve for controlling normal service conditioning and regeneration in a water conditioning system.

It is another object to provide an improved water conditioning control valve for control of a five cycle water conditioning operation, including service, backwash, brining, slow rinse, and fast rinse.

It is still another object to provide a five cycle control valve which assures positive and precise control of each water conditioning cycle.

It is a further object to provide a five cycle control valve which is simpler and less expensive in construction than its forbears.

The foregoing and other objects of the present invention are realized in a unitary control valve providing five cycle control of service, backwash, brining, slow rinse and fast rinse, in a water conditioning system, with a simple and inexpensive valve construction.

The invention, both as to its organization and method of operation, taken with further objects and advantages thereof, will best be understood by reference to the following description taken in connection with the accompanying drawings, in which:

FIGURE 3 is a sectional view taken along line 3—3 of FIGURE 2; and

Figure 1:
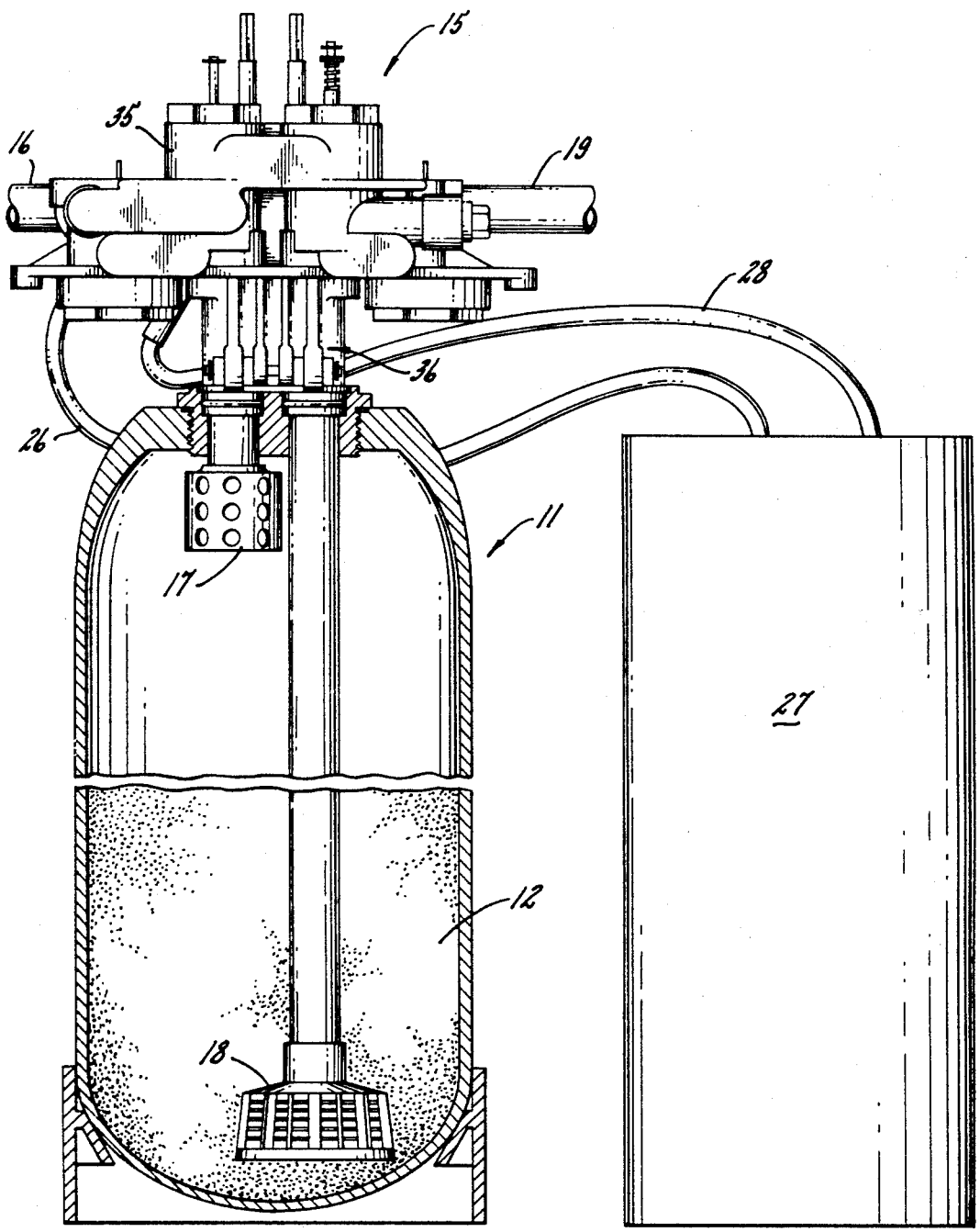
FIGURE 1 is a front elevational view of a water conditioning system including a control valve embodying features of the present invention, with parts broken away and other shown in section.

Referring now to the drawings, and particularly to FIGURE 1, a water treatment system of broadly conventional construction is illustrated generally at 10. The system 10 includes a water treatment tank 11 containing particulate material 12 through which water to be treated is passed. The particulate material 12 is a suitable resin of the type widely used in water softeners or the like, and which has the capacity for removing hardness inducing ions such as calcium and magnesium from the water which has passed through it.

In normal service operation of the water treatment system 10, a control valve 15 embodying features of the present invention directs service water from a service inlet line 16 into the tank 11 through a top baffle 17, through the particulate material 12, and out of the tank through a bottom distributor 18 to the service outlet line 19. Flow of service water in the aforedescribed pattern continues for a prescribed length of time established and controlled by a timing device of the type shown in the co-pending application of Edward J. Tischler, Ser. No. 697,722, filed Nov. 1, 1967, entitled Water Conditioning System, and assigned to the same assignee as the present invention. The system 10 is a five cycle water conditioning system, and the aforedescribed service flow of water is considered the first cycle. At the end of the service cycle, the aforementioned timing device, which forms no part of the present invention, initiates and controls the duration of the four regeneration cycles backwash, brining, slow rinse, and fast rinse.

Immediately following service cycle treatment of the water, the control valve 15 initiates the second or backwash cycle of water flow from the service inlet line 16, through the valve, and out of the bottom distributor 18 adjacent the bottom of the particulate material 12 in the tank 11. The backwash water flows upwardly through the particulate material 12, washing out solid particles of foreign material and the like, and carrying this foreign material out through the top baffle 17 and the valve 15 to a drain conduit 25 connected to the valve (see FIGURE 2).

After the backwash cycle of predetermined length, determined by the aforementioned timing device (not shown), the control valve 15 initiates the third and brining cycle. In the brining cycle, the vale 15 directs water flowing from the inlet service line 16 through the valve 15 to a brine line 26 connected to a brine tank 27 in a well-known manner. This flow of service water picks up brine in the brine tank 27 and returns through the brine line 28 to the control valve 15, laden with brine. The brine passes into the tank 11 through the top baffle 17 and is effective to remove the aforedescribed hardness inducing ions from the particulate material 12 as it passes through the material. This brine then passes out of the tank 11 through the bottom distributor 18 into the valve 15 and out of the drain conduit 25.

After a predetermined length of time, dictated by the amount of brine available in the brine tank 27, the brining cycle terminates automatically with the exhaustion of brine. The amount of brine available in the tank 27 is controlled in a well known manner not pertinent to the present invention. Accordingly, the tank 27 is not described in greater detail. Suffice it to say that after a predetermined period of time in which service water flows through the brine tank 27 and returns laden with brine, the brine is exhausted and the flow of water continues without a salt content.

For an additional predetermined period of time, the valve 15 permits this service water, unladen with brine, to pass through the material 12 in the tank 11 from the top baffle 17 to the bottom distributor 18 and then to the drain conduit 25. This fourth or slow rinse cycle of the five cycle process begins washing out residual brine and other foreign material present in the material 12.

At the end of the total time interval prescribed for the brining and slow rinse cycles, preset in the aforementioned timing device, the control valve 15 is effective to discontinue the slow rinse cycle and initiate the fifth of "fast rinse" cycle of the water conditioning operation. During the fast rinse cycle, service water enters the control valve 15 through the service inlet line 16 and is routed directly into the tank 11 through the top baffle 17. This fast rinse water washes the last traces of residual brine and foreign material from the particulate material 12 and carries it out through the bottom distributor 18 and the valve 15 to the exhaust line 25.

The fast rinse cycle continues for a predetermined period of time, again determined by the aforementioned timing device (not shown). After the predetermined time interval, the control valve 15 is effective to initiate the service cycle once more. The service cycle, which has been generally described, continues until the next regeneration is called for. During each of the regeneration cycles, the control valve continues to supply service water to the outlet service line 19, albeit untreated water.

Figure 2:
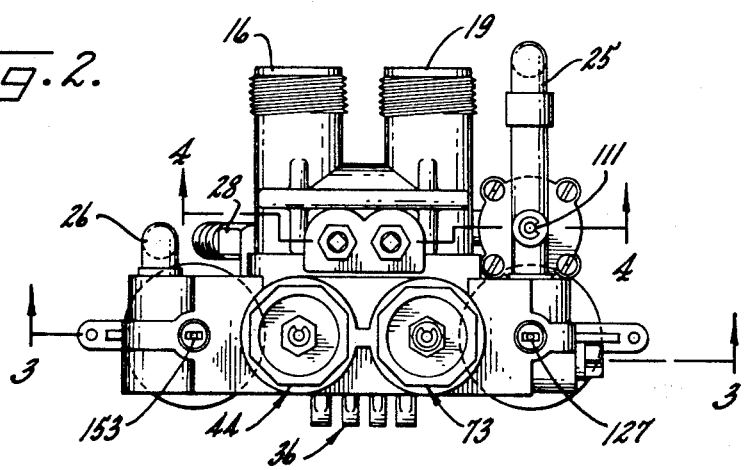
FIGURE 2 is a plan view of the control valve.
Figure 4:
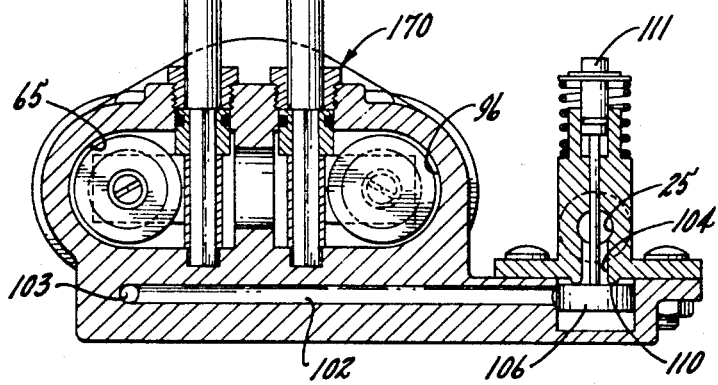
FIGURE 4 is a sectional view taken along line 4—4 of FIGURE 2, with parts removed.

Referring now to FIGURES 2–4, the control valve 15 embodying features of the present invention comprises a valve body 35 cast of brass or the like. The valve body 35 is removably mounted on the top of the treatment tank 11 by a mounting arrangement 36 (see FIGURE 1) of the type described in the copending application of Hiers et al, entitled "Water Conditioning System," Ser. No. 334,202, filed Dec. 30, 1963, and assigned to the same assignee as the present invention, now U.S. Patent No. 3,335,752, issued August 15, 1967.

The valve body includes a pair of vertically disposed passages 40 and 41 extending vertically through it in generally parallel relationship. The passage 40 is open at its lower end 43 and connected with the top baffle 17 in the tank 11 through the mounting arrangement 36. According to the present invention, a two way valve assembly 44 is seated in and seals the opposite end 45 of the passage 40.

The passage 40 is divided into an upper passage section 48 and a lower passage section by an annular shoulder 50. The two way valve assembly 44 includes a plug 51 which is threaded into the open end 45 of the passage section 48 in a well known manner. The annular lower face 52 of the plug 51 defines a valve seat and a double disc valve head 55, 56 is movable between the seat 52 and an annular valve seat 57 defined by the upper face of the shoulder 50.

The valve head 55, 56 is mounted on a stem 58 which is slidable in seated relationship in a well-known manner through the plug 51. The stem passes through a subpassage section 60 within the plug 51, the section 60 being in communication past stem guide ribs 61 with the upper passage section 48 through the valve seat 52. Radial parts 62 are also formed in the plug 51, for reasons hereinafter discussed in detail. The valve head 55, 56 is movable with the stem 58 between valve seats 52 and 57, to alternatively seal off communication between the upper passage section 48 and the sub-passage section 60, or between the upper passage section and the lower passage section 49.

During the normal service cycle in the water conditioning system 10, the valve head 55 is held in the solid line or position "up" illustrated in FIGURE 3, against the valve seat 52, by the aforementioned timing device (not shown) acting on stem 58. With the valve head 55, 56 in its up position, raw water entering the upper passage section 48 through a raw water inlet port 65 from the service line inlet 16 is directed downwardly through the lower passage section 49 of the passage 40 and into the tank 11 through the upper baffle 17. This service water passes through the particulate material 12, is treated to remove hardness inducing ions and the like in the manner hereinbefore discussed, and enters the lower distributor 18. The treated water passes from the lower distributor 18 into the valve passage 41 through its open lower end 66.

The passage 41 includes a lower passage section 70 and an upper passage section 71 separated by an annular shoulder 72. A one-way valve assembly is seated in and seals the upper end 74 of the passage 41. The valve assembly 73 includes a valve head 80 movable longitudinally in the upper passage section 71 and adapted to seat on the annular valve seat 81 of the shoulder 72.

The valve 80 is positively retained in dotted line position retracted from the valve seat 72 during normal service softening and in its solid line position (see FIGURE 3) against the valve seat 72 during regeneration. A spring 85 encircles the valve stem 86 and extends between a shoulder 87 on the stem and a lever arm 88 of the timer (not shown). The stem 86 extends through a plug 91 of the valve assembly 73 suitably threaded into the upper end 74 of the passage section 71.

Accordingly, when the lever arm 88 moves the valve 80 to its solid line position, the valve seats tightly on the seat 81 regardless of the tolerance imperfections.

During normal service softening with the valve 80 in its dotted line position softened water entering the passage section 70 then flows past the valve seat 72 into the passage section 71. This softened water departs the valve 75 to the service line 19 through the outlet port 96.

When the timing device (not shown) in the system 10 calls for regeneration cycles to begin, it moves the valve stem 58 downwardly and, accordingly, moves the valve heads 55, 56 downwardly to the dotted line position in FIGURE 3. With the valve head 55, 56 in its dotted line position, communication between the service water inlet port 65 and the lower passage section 49 of the passage 40 is shutoff and raw water is directed upwardly into the sub-passage section 60 of the plug 51. The sub-passage section 60 is connected by the ports 62 with the upper passage section 71 of the passage 41 through the bypass channel 100. Accordingly, raw water is by-passed directly to the outlet port 96 into service through the service outlet line 19.

At the same time, however, since the valve 80 is in its raised or dotted line position, as seen in FIGURE 3, a portion of this raw water is directed into the lower passage section 70 of the passage 41. This raw water enters the tank 11 through the lower distributor 18 and is forced upwardly through the particulate material, backwashing it to stir up the particulate material and remove some of the foreign matter which has accumulated in it. This backwash water is forced through the upper baffle 17 into the lower passage section 49 of the passage 40.

The valve 55 is, at this time, in its dotted line down position. Accordingly, the backwash water is directed through a transfer passage 102 extending from a port 103 in the lower passage section 49 of the passage 40 to a port 104 in communication with the drain passage 25 through an outlet fitting 105, as seen in FIGURE 4. The port 104 is open during this backwash cycle because a valve 106 in the fitting 105 has been forced down off the valve seat 110 by the timing device (not shown). The valve head 106 is connected to the timing device through a valve stem 111 which is spring loaded toward a valve closed position, the timing device opening the port 104 only during a backwash cycle of prescribed length. After the aforedescribed backwash cycle has run its full interval, the control valve 15 is manipulated to initiate the brining cycle. In doing so, the valve 55 is maintained in its down or solid line position. It cannot flow past the valve seat 81 into the passage 71, however. Service water entering the inlet port 65 continues to be bypassed through the bypass passage 100 to the outlet port 96 and to service through the outlet service line 19. The valve 80 is lowered to seat against valve seat 81 by the lever arm 88.

At the same time, a valve port 120 is opened by the timing device to place the lower passage section 70 of the passage 41 in communcation with the drain line 25 through drain passages 123 and 124. A valve head 125 is normally seated against a valve seat 126 surrounding the port by a coil spring 126a. The timing device manipulates a stem 127 on the valve head 125 extending upwardly through the drain line 25 and out of the valve body 35 to force the valve head 125 away from the seat 126.

With the lower passage section 70 of the passage 41 open to drain pressure which is virtually atmospheric pressure, it will be recognized that the back pressure present in the lower passage section 49 of the passage 40 is also negligible. Accordingly, the back pressure at the inlet port 135 from the brine return conduit line 18 is also negligible. Since the line pressure in the household exceeds this negligible pressure by a substantial amount, the raw water entering the inlet port 65, in addition to being bypassed to the outlet port 96, is also forced through the brine passage 136 and the port 137 to the brine line 26. This raw water proceeds through the brine tank 27, in a manner hereinbefore discussed, and returns laden with brine, through the brine line 28 to the port 135 in communication with the lower passage section 49 of the passage 40.

The brine enters the top baffle 17 from the passage 40 and removes the accumulated calcium and magnesium ions from the particulate, replacing them with sodium ions. This brine leaves the tank through the bottom distributor 18, the lower passage section 70 of the passage 41, and drain passages 123, 124, the drain chamber 121, and through the port 120 to the drain line 25.

The brining or third cycle continues for a period of time depending upon the amount of brine available in the brine tank 27 and other variables. When the supply of brine is exhausted, raw water continues to flow to and from the brine tank 27 in the manner hereinbefore discussed above, but no brine is picked up in the brine tank. Accordingly, slow rinsing of the patriculate material 12 in the conditioning tank 11 is accomplished, with the rinse water departing through the drain line 25 via the same path by which the brine was exhausted. This is the slow rinse or fourth cycle and continues until the timing device is effective to open the port 140 in the fast rinse chamber 141 of the valve body 35 and initiate the fourth or fast rinse cycle.

Opening the port 140 places the inlet port 65 in communication with the lower passage section 49 of the passage 40, out through the passage 136, the chamber 137a, the vertical passage 142, the rinse chamber 141, the port 140, and the horizontal passage 144. The port 140 is normally closed by a valve head 147 seated against a valve seat 150 surrounding the port 140, under the urging of a coil spring 151. The port 140 is opened by the timing device pressing downwardly on a valve stem 153 extending upwardly through the port 140 and out of the valve body 35, against the bias of the spring 151.

During the fast rinse or fifth cycle of operation, rinse water is directed at an increased rate of flow from the inlet port 65 through the fast rinse passages and past the fast rinse valve head 147, in the manner hereinbefore discussed, into the lower passage section 49 of the passage 40 and the tank 11 through the baffle 17. This fast rinse water removes virtually all the residual brine and foreign material from the particulate material 12 in the tank 11 and carries it up through the lower distributor 18 and out of the drain passages to the drain line 25 in the manner also hereinbefore discussed.

When a prescribed period of time for fast rinse has elapsed, the timing device (not shown) is effective to reposition the various valve heads in the valve 15 for service treatment of the water. The water is once more conditioned or softened for an extended period of time, after which regeneration is cycled again.

If at any time during operation of the system 10 pressure exceeds a predetermined amount at the outlet port 96, a check valve 160 in a relief passage 161 connecting the passage section 71 which the drain line 25 is forced away from the seat 162 against the bias of spring 163. Pressure is relieved to the drain line 25. Obviously, however, the system might be constructed without the check valve 160, etc.

If there is no necessity for water being softened during a particular use period, such as when lawn sprinkling, a bypass valve assembly 170 in the valve 15 is manipulated to shunt service water directly from line 16 to line 19. This assembly 170 is seen best in FIGURE 4, but, since it forms no part of the present invention, is not described in detail. In fact, this bypass feature is not included in some valves.

We claim:

1. A control valve assembly for a five-cycle water conditioning system, comprising: a valve body, a first main passage in said body having an opening for communicating with a conditioning tank, a service water inlet in said first main passage, a second main passage in said body having an opening for communicating with the conditioning tank, a service water outlet in said second main passage, a transfer passage connecting said main passages, a first valve seat in said first main passage opposite said inlet from said transfer passage and between said inlet and the first main passage opening, a second valve seat in said first main passage between said inlet and the transfer passage connecting said main passages, inlet valve means movable in said first main passage between said first valve seat and said second valve seat to alternatively cut off direct fluid communication between said inlet and said first main passage opening or between said inlet and said transfer passage, a third valve seat in said second main passage between said outlet and said second main passage opening, outlet valve means movable in said second main passage between a position against said third valve seat whereby fluid communication between said second main passage opening and said outlet is cut off and a position away from said third valve seat, first branch passage means connecting said inlet with said first main passage between said second valve seat and said first main passage opening, rinse valve means in said first branch passage means for opening and closing fluid communication between said inlet and said first main passage opening through said first branch passage means, second branch passage means connecting said second main passage between said third valve seat and said second main passage opening with a drain port out of said valve body, and drain valve means in said second branch passage means for opening and closing fluid communication between said second main passage opening and said drain port through said second passage means.

2. A control valve assembly for a five cycle water conditioning system comprising: a valve body, a first main passage in said body having an opening for communicating with a conditioning tank, a service water inlet in said first main passage, a second main passage in said body having an opening for communicating with the conditioning tank, a service water outlet in said second main passage, a transfer passage connecting said main passages, a first valve seat in said first main passage opposite said inlet from said transfer passage and between said inlet and the first main passage opening, a second valve seat in said first main passage between said inlet and the transfer passage connecting said main passages, inlet valve means movable in said first main passage between said first valve seat and said second valve seat to alternatively cut off direct fluid communication between said inlet and said first main passage opening or between said inlet and said transfer passage, a third valve seat in said second main passage between said outlet and said second main passage opening, outlet valve means movable in said second main passage between a position against said third valve seat whereby fluid communication between said second main passage opening and said outlet is cut off and a position away from said third valve seat, first branch passage means connecting said inlet with said first main passage between said second valve seat and said first main passage opening, rinse valve means in said first branch passage means for opening and closing fluid communication between said inlet and said first main passage opening through said first branch passage means, second branch passage means connecting said second main passage between said third valve seat and said second main passage opening with a drain port out of said valve body, first drain valve means in said second branch passage means for opening and closing fluid communication between said second main passage opening and said drain port through said second branch passage means, third branch passage means connecting said first main passage between said second valve seat and said first main passage opening with said drain port, and second drain valve means in said third branch passage means for opening and closing fluid communication between said first main passage opening and said drain port through said third branch passage means.

3. The control valve assembly of claim 2 further characterized in that the five cycles of water conditioning include service, backwash, brining, slow rinse, and fast rinse, and during the service cycle said inlet valve means seated against said second valve seat, said outlet valve means is retracted from said third valve seat, and said remaining valve means are closed.

4. The control valve assembly of claim 3 further characterized in that during the backwash cycle said inlet valve means is seated against said first valve seat, said outlet valve means is retracted from said third valve seat, said rinse valve means and said first drain valve means are closed, and said second drain valve means is opened.

5. The control valve assembly of claim 4 further characterized in that during said brining and slow rinse cycles said inlet valve means is seated against said first valve seat, said outlet valve means is seated against said third valve seat, said rinse valve means and said second drain valve means are closed, and said first drain valve means is open.

6. The control valve assembly of claim 5 further characterized in that during said fast rinse cycle said inlet valve means is seated against said first valve seat, said outlet valve means is seated against said third valve seat, said rinse means and said first drain valve means are open, and said second drain valve means is closed.

7. A control valve assembly for a five cycle water conditioning system comprising: a valve body, a first main passage in said body having an opening for communicating with a conditioning tank, a service water inlet in said first main passage, a second main passage in said body having an opening for communicating with the conditioning tank, a service water outlet in said second main passage, a transfer passage connecting said main passages, a first valve seat in said first main passage opposite said inlet from said transfer passage and between said inlet and the first main passage opening, a second valve seat in said first main passage between said inlet and the transfer passage connecting said main passages, inlet valve means movable in said first main passage between said first valve seat and said second valve seat to alternatively cut off direct fluid communication between said inlet and said main passage opening or between said inlet and said transfer passage, a third valve seat in said second main passage between said outlet and said second passage opening, outlet valve means movable in said second main passage between a position against said third valve seat whereby fluid communication between said second main passage opening and said outlet is cut off and a position away from said third valve seat, first branch passage means connecting said inlet with said first main passage between said second valve seat and said first main passage opening, rinse valve means in said first branch passage means for opening and closing fluid communication between said inlet and said first main passage opening through said first branch passage means, second branch passage means connecting said second main passage between said third valve seat and said second main passage opening with a drain port out of said drain valve, drain valve means in said second branch passage means for opening and closing fluid communication between said second main passage opening and said drain port through said second branch means, and relief valve passage means extending between said outlet and said drain port, said relief valve passage means containing relief valve means for relieving pressure at said inlet to said drain when said pressure exceeds a predetermined amount.

8. The control valve assembly of claim 7 further characterized by and including a third branch passage means connecting said first main passage opposite said first main passage opening from said inlet with said drain port, second drain valve means in said third branch passage means for opening and closing fluid communication between said first main passage opening and said drain port through said third branch passage means.

References Cited

UNITED STATES PATENTS

| | | | |
|---|---|---|---|
| 3,019,817 | 2/1962 | Whitlock | 210—191 X |
| 3,181,564 | 5/1965 | Rudelick | 210—190 X |
| 3,215,273 | 11/1965 | Kryzer | 137—599.1 X |
| 3,335,752 | 8/1967 | Hiers et al. | 137—599.1 |
| 3,348,574 | 10/1967 | Brane | 137—599.1 |

WILLIAM F. O'DEA, *Primary Examiner.*

DENNIS H. LAMBERT, *Assistant Examiner.*

U.S. Cl. X.R.

210—190

PO-1050
(5/69)

UNITED STATES PATENT OFFICE
CERTIFICATE OF CORRECTION

Patent No. 3,433,259          Dated March 18, 1969

Inventor(s) J. E. Hiers et al

It is certified that error appears in the above-identified patent and that said Letters Patent are hereby corrected as shown below:

Column 1, line 54, change "forbears" to --forebears--

Column 2, line 22, change "697,722" to --679,722-- line 46, change "vale" to --valve--

Column 3, line 60, change "parts" to --ports--

Column 6, line 4, change "which" to --with--

SIGNED AND
SEALED
NOV 4 1969

(SEAL)
Attest:

Edward M. Fletcher, Jr.
Attesting Officer

WILLIAM E. SCHUYLER, JR.
Commissioner of Patents